United States Patent [19]

Bouvot

[11] Patent Number: 4,772,807
[45] Date of Patent: Sep. 20, 1988

[54] ELECTRIC CONTROL DEVICE FOR CONTROLLING DISPLACEMENT OF AN ELEMENT BETWEEN TWO PREDETERMINED POSITIONS

[75] Inventor: Jean-François Bouvot, Dampierre, France

[73] Assignee: Valeo, Paris, France

[21] Appl. No.: 943,807

[22] Filed: Dec. 19, 1986

[30] Foreign Application Priority Data

Dec. 19, 1985 [FR] France ................ 85 18870

[51] Int. Cl.$^4$ ............... H01H 35/00; H01H 61/02; H01H 3/00
[52] U.S. Cl. ................... 307/119; 337/140; 337/141; 200/153 R; 60/527
[58] Field of Search ............ 307/119, 120; 337/140, 337/141; 60/527; 200/153 K

[56] References Cited

U.S. PATENT DOCUMENTS

| 3,613,732 | 10/1971 | Wilson et al. ............. 137/625.4 X |
| 3,725,835 | 4/1973 | Hopkins et al. ............. 337/140 |
| 3,917,327 | 11/1975 | Plasko ............. 292/1 |
| 4,463,560 | 8/1984 | Greenleaf et al. ............. 60/527 |
| 4,472,113 | 9/1984 | Rogen ............. 60/527 X |
| 4,524,343 | 6/1985 | Morgan et al. ............. 60/527 |

FOREIGN PATENT DOCUMENTS 1499804 9/1967 France .
2549978 2/1985 France .

OTHER PUBLICATIONS

Japan Patent Abstracts, vol. 9. No. 11 (M-351)[1374], Jan. 1985.
Japan Patent Abstracts, vol. 9, No. 297 (M-432), [2020], Nov. 1985.

Primary Examiner—William M. Shoop, Jr.
Assistant Examiner—Sharon D. Logan
Attorney, Agent, or Firm—Dennison, Meserole, Pollack & Scheiner

[57] ABSTRACT

The invention relates to an electric control device for controlling displacement of a moving element (22) between two predetermined positions, said element (22) being associated with one or two electrically conductive return means (18, 30) having shape memory which exert substantially no return force on the element (22) so long as no electric current is passing therethrough, and which exert sufficient force thereon to displace it when an electric current is caused to pass therethrough, with an electric current being switched through one or other of the return means by a controlling switch (10). Once the moving element has reached the desired predetermined position, the electric current used to move it is interrupted by means of a toggle switch (24) operated by the moving element. The invention is applicable to selecting pneumatic functions, e.g. in the motor industry.

6 Claims, 3 Drawing Sheets

4,772,807

ELECTRIC CONTROL DEVICE FOR CONTROLLING DISPLACEMENT OF AN ELEMENT BETWEEN TWO PREDETERMINED POSITIONS

The invention relates to an electric control device for controlling displacement of an element between two predetermined positions, said element being, for example, the moving member of a pneumatic switch connected in series in the pressure fluid feed circuit to a device such as a pneumatic actuator, or the like.

BACKGROUND OF THE INVENTION

Such an electric control device is usable, in particular, in the motor industry for selecting functions in a pneumatic logic circuit.

Electric control devices already exist in which a moving element to be displaced between one or the other of two predetermined positions is connected, firstly to resilient return means urging it towards a first of said positions, and secondly to a plunger core of a solenoid device which moves the moving element into the second predetermined position when electric current passes through the solenoid.

Such a device suffers from the drawback that the moving element is held in its second position only so long as an electric current passes through the solenoid of the control device.

An object of the present invention is to provide an electric control device of the above-mentioned type which needs to consume electrical energy only during the time required for displacing the moving element into either of its two predetermined positions.

SUMMARY OF THE INVENTION

The present invention provides an electric control device for controlling displacement of an element between two predetermined positions, said element being associated with first and second means disposed on respective sides of the element and capable of exerting forces in opposite directions on said element to displace it towards said first and second predetermined positions respectively, at least one of said means being made of an electrically-conductive material having shape memory, said device including the improvement whereby the moving element is connected by toggle means to the moving contact of an electric switch which is connected in series with said means having shape memory, said switch being suitable for interrupting the flow of electric current through said return means having shape memory once the element has been displaced from one position to the other by the force exerted thereon by said return means having shape memory.

The flow of electric current through the shape memory return means is thus automatically interrupted once the moving element has reached the predetermined position towards which it is urged by said return means.

Advantageously, the other return means associated with the moving element is likewise constituted by an electrically-conductive material having shape memory which is electrically connected in parallel with the first shape memory return means, with said return means being selectively connectable to a source of electrical energy by a controlling changeover switch.

The user can thus operate said switch at will to cause an electric current to pass through one or other of the shape memory return means in order to move the moving element into one or the other of its predetermined positions.

Both shape memory return means are connected electrically in parallel between the controlling changeover switch and the toggle switch associated with the moving element.

Thus, the flow of electricity through either of the shape memory return means is automatically interrupted when the moving element reaches either of its two predetermined positions.

Advantageously, a device in accordance with the invention includes a plurality of moving elements each displaceable between two predetermined positions, which elements have their shape memory return means electrically connected in parallel or in series with interdependent push-button operated control switches. The moving elements may themselves be connected in parallel.

Such a device can be used under push-button control to select a particular combination of functions to be performed by a logic circuit.

In one application of the invention which is particularly applicable to the motor industry, the or each moving element is the moving member of a pneumatic switch which is connected in series in the pressure fluid feed circuit of a device such as a pneumatic actuator.

BRIEF DESCRIPTION OF THE DRAWINGS

An embodiment of the invention is described by way of example with reference to the accompanying drawings, in which.

DETAILED DESCRIPTION

Figure 2:
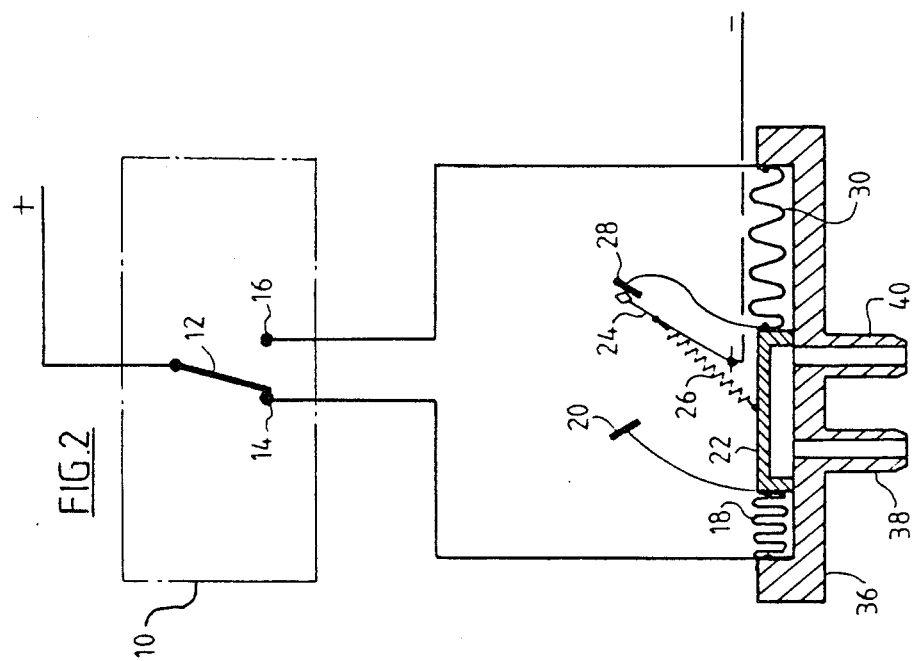
FIGS. 1 and 2 are diagrams showing the two possible states of a device in accordance with the invention and associated with a pneumatic switch.
Figure 1:
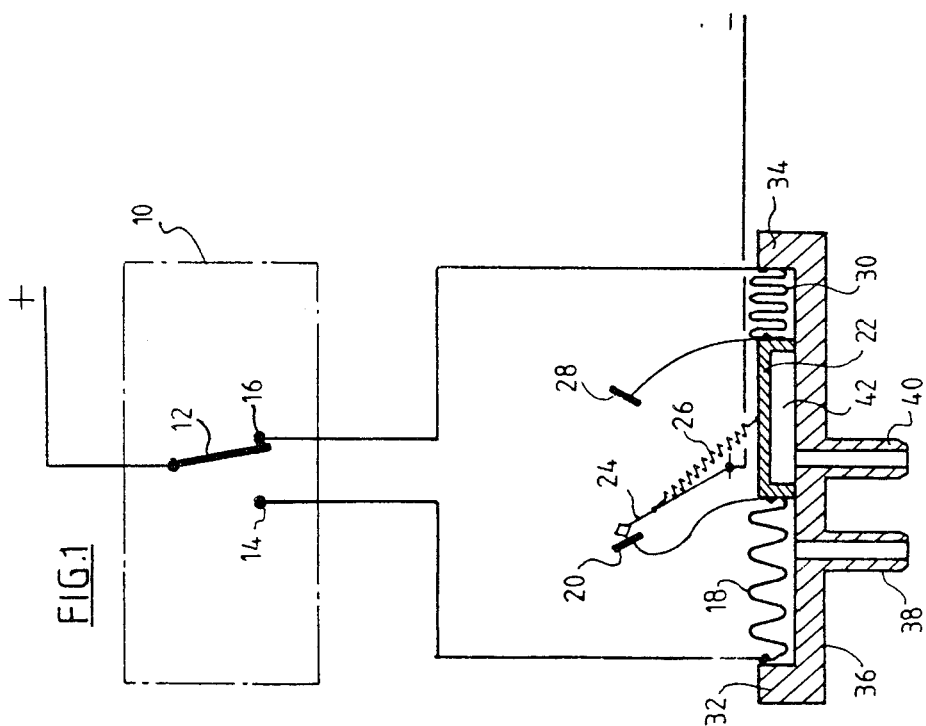

Reference is made initially to FIGS. 1 and 2 which are diagrams showing a control device in accordance with the invention.

This device comprises a control changeover switch 10 mounted, for example, on the dashboard of a motor vehicle, and comprising a moving contact 12 which is connected to one terminal of a source of electrical energy and which is movable by the user between first and second fixed contacts 14 and 16 respectively.

The first fixed contact 14 of the switch 10 is electrically connected to one end of a first return means 18 made of an electrically conductive material having shape memory, and whose other end is electrically connected to a first fixed contact 20 of an electric switch associated with a moving element 22 made of electrically insulating material and displaceable between two predetermined positions.

The moving contact 24 of this switch is connected via a compression spring 26 to the moving element 22. The second fixed contact 28 of this switch is electrically connected to one end of a second return means 30 which is electrically conductive and has shape memory, and whose other end is connected to the second fixed contact 16 of the control switch 10.

The moving contact 24 of the switch associated with the moving element 22 is electrically connected to the other terminal of the source of electrical energy.

The moving element 22 is mounted in a housing 36 made of electrically insulating material between the two return means 18 and 30 made of material having shape memory. The moving element is displaceable between the return means 18 and 30 which are connected to it in a push-pull arrangement with first ends of the return means 18 and 30 being fixed to opposite ends of the the moving element 22, and with the opposite ends of the return means being fixed to respective fixed abutments 32 and 34 constituted, for example, by walls of the housing 36. The housing also includes two tubular end fittings 38 and 40 which open out into the path of the moving element 22.

The tubular end fitting 38 may be connected, for example, to a pressure fluid device such as a single action pneumatic actuator, and may serve to feed said device selectively with fluid under pressure or with air at atmospheric pressure. The other tubular end fitting 40 is connected to a source of fluid under pressure (e.g. air) with said pressure being either greater than or less than atmospheric pressure.

The moving element 22 and the face of the wall of the housing 36 through which the end fittings 38 and 40 open out delimit a closed chamber 42. The chamber 42 is defined by a rim 44a on the moving element 22, with the thickness of the rim being greater than the inside diameter of either end fitting 38 and 40 so as to be able to close the openings of said end fittings in sealed manner. The length of the chamber 42 (i.e. its size in the displacement direction of the moving element 22) is greater than the distance between the ends of the end fittings 38 and 40 so as to make it possible for both end fittings to simultaneously open out into the chamber 42 when the moving element 22 is in one of its predetermined positions.

As mentioned above, the return means 18 and 30 for displacing the moving element 22 between two predetermined positions are made of electrically conductive material having shape memory such that, when heated by passing an electric current either return means takes up a predetermined shape, but when cold, i.e. when no current is flowing therethrough, is capable of taking up any shape while exerting a substantially negligible force on the moving element 22.

Such material is commercially available under the trademark VEASE and is sold, in particular, by RAY-CHEM Corporation.

The operation of a device in accordance with the invention is described with reference to FIGS. 1, 2, 3A, 3B, and 3C.

In FIG. 1, the control switch 10 has been operated so that its moving contact 12 is connected to its second fixed contact 16 which is itself electrically connected to one end of the second return means 30 whose other end is connected to the second fixed contact 28 of the switch associated with the moving element 22. The moving contact 24 of this switch is connected to the other fixed contact 20 thereof so that no electric current passes through either of the return means 18 and 30, and the connection with the source of electrical energy is interrupted. The moving element 22 is in one of its predetermined positions, in which it covers and closes the outlet from the end fitting 40 which is connected to the source of fluid under pressure, leaving the opening to the end fitting 38 in direct communication with atmospheric air.

If the switch 10 is then operated to bring its moving contact 12 into contact its the fixed contact 14, an electric current flows through the return means 18 via the circuit 12, 14, 18, 20, and 24. Because of the current flowing through it, the return means 18 immediately heats up and then takes up a predetermined shape as shown in FIG. 2, thereby acting as a traction spring to displace the moving element 22 into its other predetermined position, in which the end fittings 38 and 40 are put into communication with each other via the chamber 42 under the moving element 22.

The spring 26 connecting the moving element 22 to the moving contact 24 of the associated switch is a compression spring such that it maintains the moving contact 24 in the FIG. 1 position, i.e. in connection with the fixed contact 20, up to a moment close to the end of displacement of the moving element 22. During said displacement, the spring 26 is compressed and near the end of the displacement it toggles over the moving contact 24 so as to bring it into contact with the other fixed contact 28 of the switch. The flow of electric current through the return means 18 is thus interrupted, and no electric current passes through the other return means 30 either so long as the moving contact 12 of the controlling switch 10 remains in connection with the first fixed contact 14 of the controlling switch.

Conversely, in order to pass from the state shown in FIG. 2 to the state shown in FIG. 1, the controlling switch 10 is operated to bring its moving contact 12 into contact with its second fixed contact 16. The second return means 30 is then heated by a flow of electric current and thus returns to its predetermined shape, thereby acting as a traction spring for moving the moving element 22 into the position shown in FIG. 1, with the displacement of the moving element causing the moving contact 24 of the associated switch to toggle back to the state shown in FIG. 1. The pneumatic switch thus acts as an electrical bistable switch.

In this example, the return means 18 and 30 having shape memory act as traction springs when they pass an electric current. Their ends are suitably fixed firstly to the moving element 22 and secondly to a respective one of the fixed walls 32 and 34 of the housing 36.

These return means 18 and 30 could be used as compression springs by swapping over their connections with the fixed contacts 14 and 16 of the control switch 10.

Figure 3A:
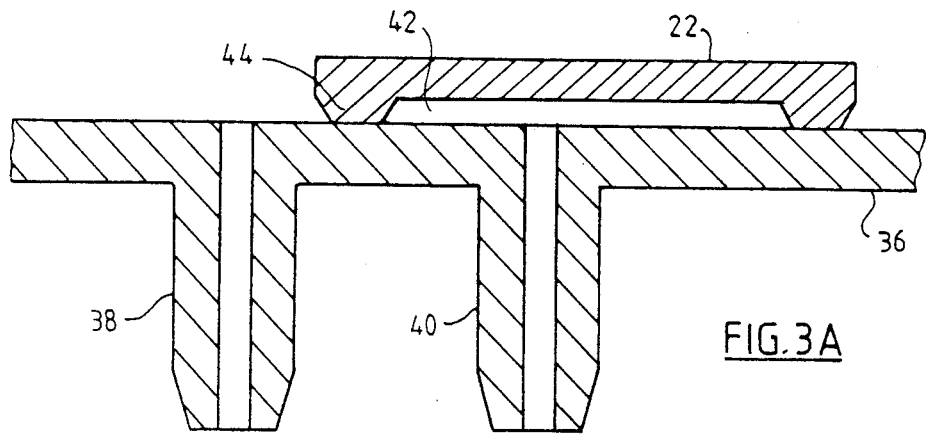
FIGS. 3A, 3B, and 3C are diagrams showing how the pneumatic switch operates.
Figure 3B:
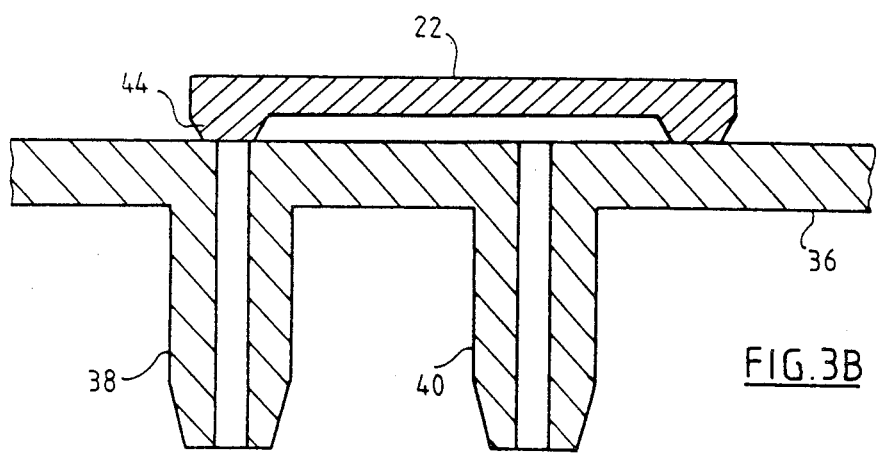
Figure 3C:
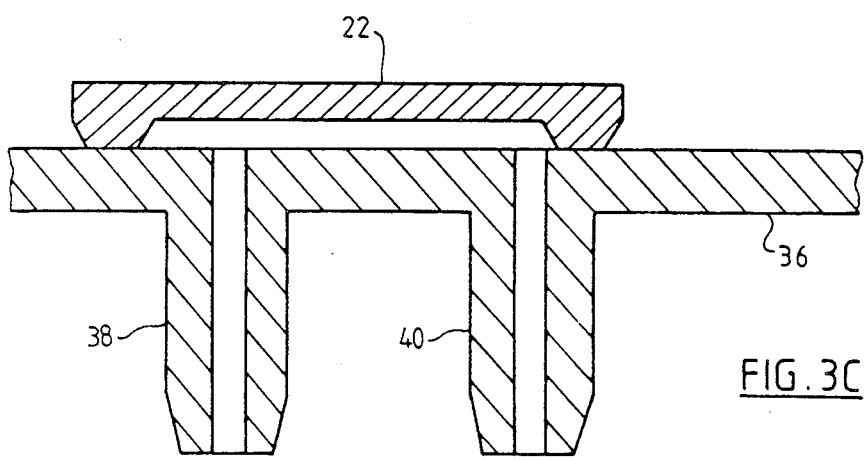

With reference to FIG. 3B, it can be seen that the opening at the end of the end fitting 38 is closed in sealed manner by the rim 44 at a given moment during the displacement of the element 22 between its two predetermined positions, thereby preventing the source of fluid under pressure being directly connected to the atmosphere at this moment. The opening at the end of the end fitting 40 always lies under the moving element 22 regardless of its position, whereas the opening at the end of the end fitting 38 is selectively covered by or released from the moving element 22.

The fluid pressure device, for example a single action pneumatic actuator, is thus selectively fed with fluid under pressure or else connected to an exhaust.

Figure 4:
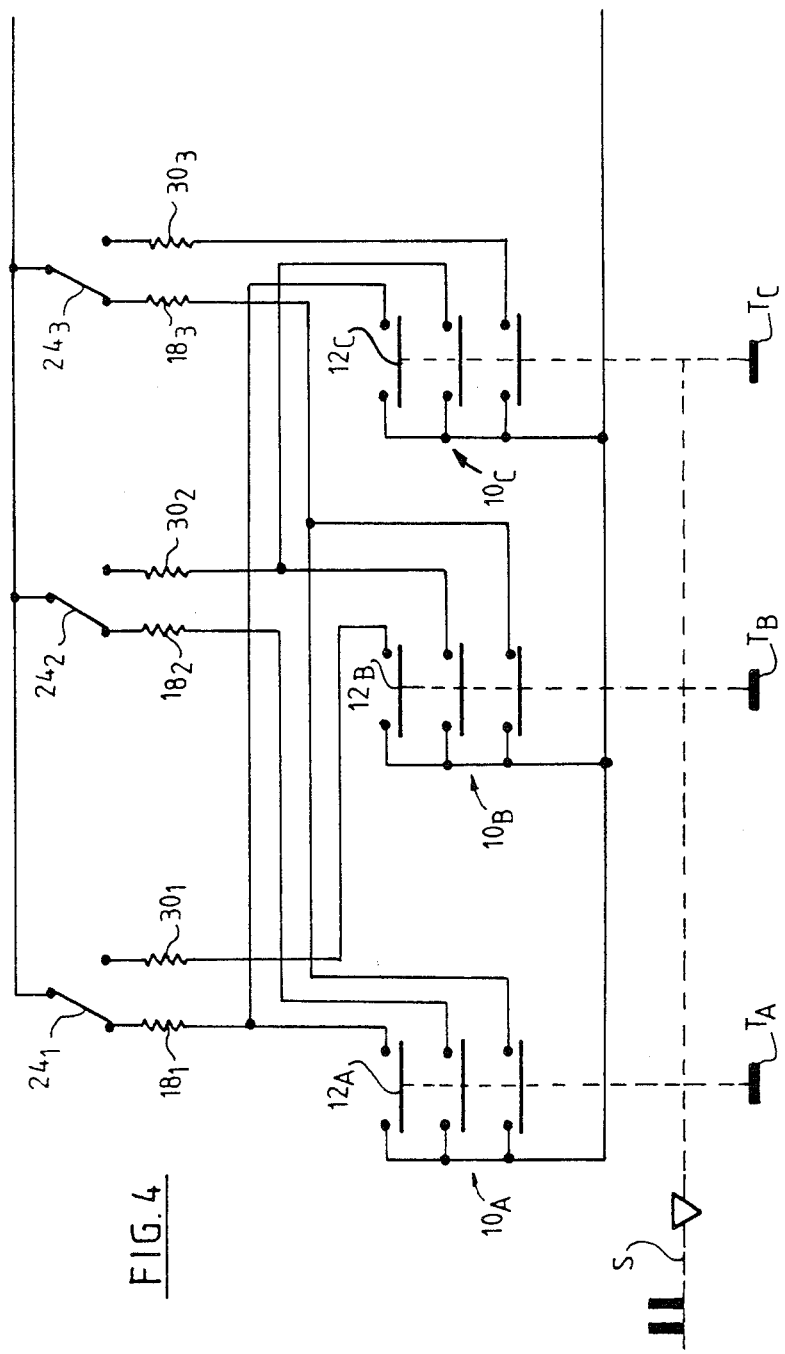
FIG. 4 is a circuit diagram of a control circuit comprising a plurality of devices in accordance with the invention.

Reference is now made to FIG. 4 which is a circuit diagram for a control installation including a plurality of devices in accordance with the invention used in combination.

There are three such devices in this embodiment, and they are represented by their electrically-conductive return means having shape memory designated by references $18_1$ & $30_1$, $18_2$ & $30_2$, $18_3$ & $30_3$, respectively, and by the electric switches associated with their moving elements and respectively designated by references $24_1$, $24_2$, and $24_3$.

The control switches for these devices are three-pole switches $10_A$, $10_B$ and $10_C$ respectively, actuated by respective user-operable push-buttons $T_A$, $T_B$, and $T_C$.

These push-buttons are interdependent, and are therefore associated with a conventional system for locking them in the depressed position in such a manner that when any one pushbutton is depressed to close the three-pole switch associated therewith, a previously-depressed switch is automatically released so that two push-buttons cannot be simultaneously locked in the depressed position.

One of the moving contacts $12_A$, $12_B$, or $12_C$ of each switch $10_A$, $10_B$ and $10_C$ serves, when the corresponding push-button is depressed, to connect one terminal of the source of electrical energy to the shape memory return means which are electrically connected to said switches. The switches $24_1$, $24_2$, $24_3$ each connect a shape memory spring to the other terminal of the source of electrical energy.

In the example shown, the switch $10_A$ is connected to return means $18_1$, $18_2$, and $18_3$, the switch $10_B$ is connected to return means $30_1$, $30_2$, and $18_3$, and switch $10_C$ is connected to return means $18_1$, $30_2$, and $30_3$.

If push-button $T_A$ is depressed from the state shown in FIG. 4, an electric current is caused to pass through return means $18_1$, $18_2$, and $18_3$, so that the associated moving elements are displaced into their opposite predetermined positions, and the pneumatic actuators associated with these three devices are all fed with fluid under pressure.

When the push-button $T_B$ is depressed from the state shown in FIG. 4, electric current passes only through return means $18_3$ thereby displacing the associated moving element to feed the corresponding actuator with fluid under pressure, while the other two actuators remain in the state shown, i.e. connected to exhaust.

When push-button $T_C$ is depressed from the state shown in FIG. 4, an electric current passes only through the return means $18_1$ which displaces the associated moving element into its opposite position to feed the corresponding actuator with fluid under pressure, while the other two actuators remain in their previous positions, i.e. connected to exhaust.

When an actuator is already in the position requested by depressing a push-button, nothing happens and the actuator remains in that position.

I claim:

1. An electric control device for controlling displacement of a moving element (22) between two predetermined positions, said moving element being associated with first and second return means (18, 30) disposed on respective opposite sides of the moving element and capable of exerting forces in opposite directions on said moving element to displace it towards said first and second predetermined positions respectively, at least one of said return means (18, 30) being made of an electrically conductive material having shape memory, and wherein the moving element is connected to a moving contact (24) carried by a pivoting toggle lever means of an electric bistable switch which is connected in series with said return means, said switch being suitable for interrupting the flow of electric current through said return means once the moving element has been displaced from one predetermined position to the other by the force exerted thereon by said return means, the movement of said moving element beyond a predetermined point serving to move said toggle lever means and its contact to a position to interrupt the flow of current.

2. A device according to claim 1, wherein the electrically-conductive material having shape memory is suitable, when heated by a flow of electric current, for taking up a predetermined shape to move said element to a predetermined position, and when not passing an electric current, for exerting a substantially negligible force on said element.

3. A device according to claim 2, wherein both return means for the moving element are constituted by an electrically-conductive material having shape memory, which return means is connected electrically in parallel with each return means being selectively connectable to a source of electrical energy by means of a controlling changeover switch.

4. A device according to claim 3, wherein both return means having shape memory are electrically connected in parallel between said controlling changeover switch and the switch which is associated with the moving element.

5. A device according to claim 1, comprising a plurality of moving elements each of which is displaceable between two predetermined positions, said elements being connected in parallel relative to one another and having their shape memory return means electrically connected in parallel or in series to control switches which are actuated by interdependent push-buttons.

6. A device according to claim 1, wherein said moving element is constituted by the moving member of a pneumatic switch connected in series in the pressure feed circuit to a pressure-operated device such as a pneumatic actuator, for example.

* * * * *